UNITED STATES PATENT OFFICE.

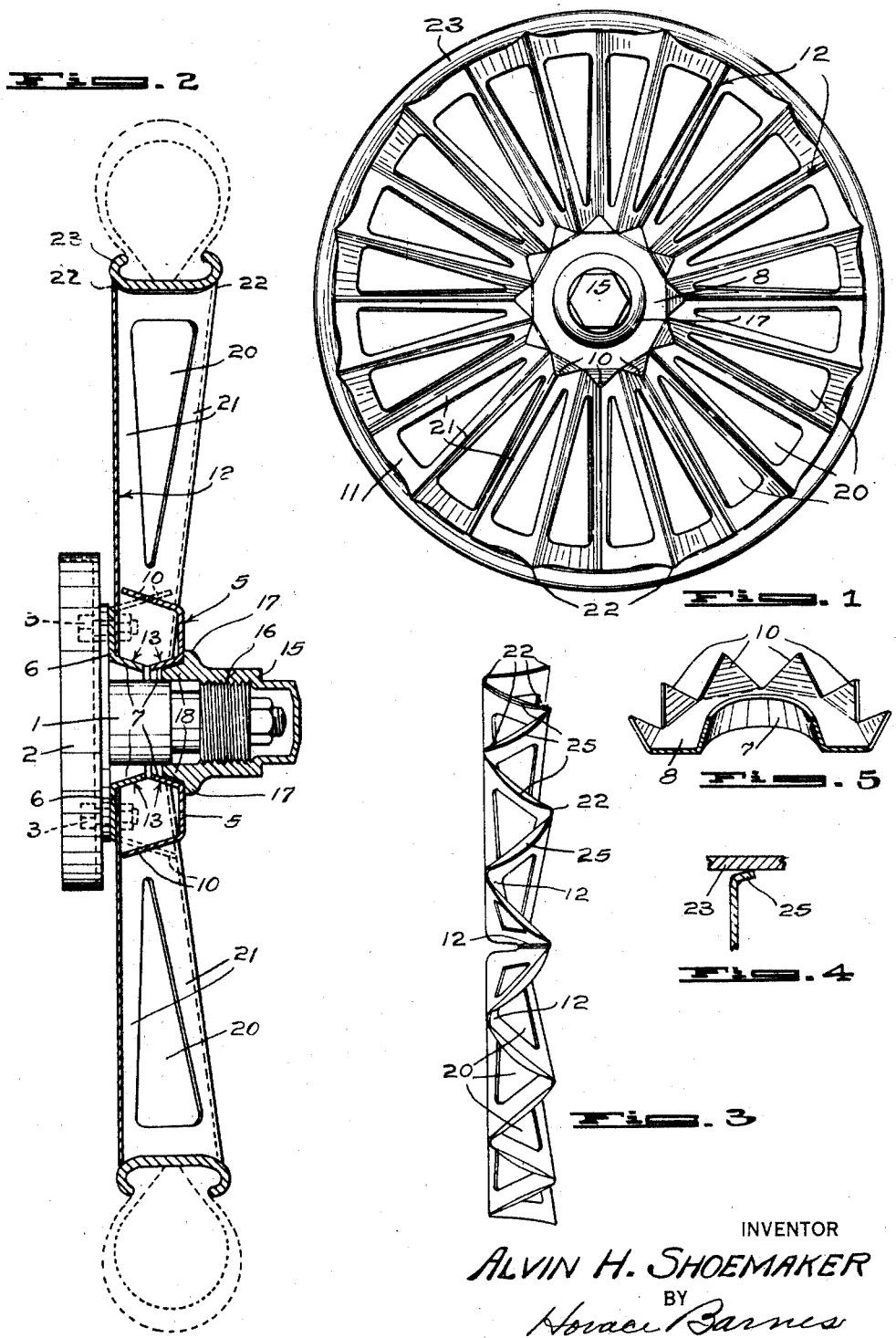

ALVIN H. SHOEMAKER, OF SEATTLE, WASHINGTON, ASSIGNOR TO KNAPPEN FINANCE COMPANY, OF SEATTLE, WASHINGTON, A CORPORATION OF WASHINGTON.

WHEEL.

1,372,982.    Specification of Letters Patent.    Patented Mar. 29, 1921.

Application filed July 8, 1918. Serial No. 243,962.

*To all whom it may concern:*

Be it known that I, ALVIN H. SHOEMAKER, a citizen of the United States, and resident of the city of Seattle, county of King, State of Washington, have invented certain new and useful Improvements in Wheels, of which the following is a clear and exact specification.

This invention relates to improvements in vehicle wheels, and more particularly to improvements in that class of wheels described in my prior patent application Serial No. 218,608, filed February 15, 1918.

The object of the present improvement is to simplify the construction of the hub structure and to render the same more efficient in operation and powerful in its function of expanding the web to bind the latter in operative position upon the wheel rim.

A further object of the invention is the provision of means upon the periphery of the web structure whereby an elastic engagement and broader bearing surface upon the wheel rim is obtained.

The invention consists in the novel construction of parts and devices comprising the hub structure of the wheel, in combination with coöperating modifications in the web; and in the engaging devices between the web and wheel rim, as will be fully described in the following specification, illustrated in the accompanying drawings, and finally set forth in the appended claims.

Referring to said drawings, Figure 1 is a view in front elevation of a wheel embodying my invention. Fig. 2 is an enlarged view in vertical section of the same. Fig. 3 is a detached view in side elevation of the web element of the invention. Fig. 4 is a fragmentary view in cross section illustrating the manner of engagement of the outer periphery of the web with the wheel rim. Fig. 5 is a perspective view in cross section of one of the side plate elements of the invention.

Referring to said views the reference numeral 1 designates the hub mounted upon the rear axle of an automobile and 2 a brake drum secured thereto by bolts 3. The hub herein illustrated is the standard Ford rear hub, but it will be evident that any other suitable form of hub may be utilized.

Numerals 5 and 6 designate respectively, front and rear side plates, see Fig. 5, formed of pressed steel of similar construction. Each plate consists of a conical flange 7 about a central aperture through which the hub extends, a plane portion 8 normally parallel with radial lines at right angles to the hub axis, and terminating at its periphery in star-points 10 bent inwardly at angles to engage between the convolutions of the web.

The web structure 11 in its general construction is similar to that illustrated and described in my said prior application and is formed from a single sheet of metal having radial corrugations which result in oppositely disposed alternate angular recesses 12 into which from opposite sides the star-points 10 engage.

The web is provided with a central aperture and thereabout is beveled from each side at corresponding angles, as at 13, which are arranged to be engaged by the conical flanges 7 of the respective side plates 5 and 6. The rear face plate 6 is bolted to the hub by the brake-retaining bolts 3 and the front face plate 5 is secured in opposite relation against the outer face of the web by means of a hub cap 15.

Said hub cap is provided with internal screw threads 16 engaging with coöperating screw threads upon the hub and is formed with a bearing flange 17 arranged to engage and exert pressure upon the plane portion 8 of the face plate 5, and is further formed with a conical projection 18 arranged to extend within the conical opening of said face plate to assist in centering the latter.

The web 11 is provided with cut-out portions 20 between said angular recesses 12. Said angular portions remaining intact constitute, in effect, integral spokes 21 which extend from the hub to the outer periphery in alternate, oppositely directed angles.

The extremities of said spokes are left high, as at 22, to engage well up on the outer surface upon opposite sides of the wheel rim 23. The web material between the points 22 is swaged over at an angle in contours corresponding to the transverse curvature of the rim 3 to provide a seat therefor, thus providing angularly bent feet 25 affording a resilient, as well as increased bearing of the web upon the rim.

When assembled in the manner illustrated and described, the hub cap is screwed inwardly to cause the bearing flange 17 to engage the face plate 5 and force the latter inwardly and at the same time, in effect, drawing the inner face plate 6, which is secured to the hub, outwardly, thus causing an approximately equal wedge action by both the conical flanges 7 against the bevel edge surfaces 13 of the web and expanding the latter outwardly and evenly in radial directions against the rim 23. The internal pressure thus exerted, causes the bent feet 25 engaging the rim, to yield and to present an increasingly large area of bearing surfaces upon the rim, as the pressure is applied, and affords opportunity for the engaging surfaces to accommodate themselves to any slight inequalities of surface that the rim may present.

When the rim with its pneumatic or other tire, indicated at 26, is to be removed from the wheel, the hub cap 15 is unscrewed for a distance to release pressure upon the face plate 5 whereupon the web contracts and the face plates 5 and 6 are parted sufficiently to allow the web to rock slightly forward, thus bringing the high points 22 upon the outer face of the web, below the inner diameter of the rim allowing the latter to be easily removed. Another similar rim may be immediately replaced in position and secured in the manner described.

Driving power from the rear axles is exerted directly through the hub 1 and the inner face plate 6, whose starpoints 10 interfit in the convolutions of the web 11. However, the wheel is united and secured in such rigid manner when secured in operative condition, that the driving power is, in practice, exerted through both inner and outer face plates to the web.

What I claim is—

1. A wheel consisting of a hub provided with screw-threads adjacent its outer end, an inner face plate secured to said hub, an outer face plate, said plates each having oppositely disposed conical flanges adjacent their central apertures and oppositely disposed inwardly directed star-points about their peripheries, a rim, an expansible spoke-web formed with radial corrugations within which upon opposite sides said star-points engage, said web being beveled from opposite sides of its central aperture to conform to the conical flanges of said face plates, and a hub-cap internally screw-threaded upon said hub and coöperating therewith to wedge said conical flanges within the central aperture of the web to expand the web against the rim.

2. A wheel consisting of a hub provided with screw-threads adjacent its outer end, an inner face plate secured to said hub, an outer face plate, said plates each having oppositely disposed conical flanges adjacent their central apertures, a rim, a spoke web formed of metal arranged to be peripherally expanded to increase its diameter to operatively contact with said rim and beveled from opposite sides of its central aperture to conform to the conical flanges of said face plates, and a hub-cap internally screw-threaded upon said hub and coöperating therewith to wedge said conical flanges within the central aperture of the web to expand the web against the rim.

3. In a wheel, a spoke-web formed of corrugated metal arranged to be expanded into operative contact with a wheel rim said web having its outer periphery formed with a seat to receive said rim, said seat consisting in a plurality of feet formed of the web material inclined at angles to cause the sides of said feet to engage the rim.

4. A wheel comprising a rim and a center one having recesses and the other projections adapted to enter said recesses and means for expanding and contracting said center to engage it with the and disengage it from the rim.

5. A wheel comprising a rim and a center, one having recesses and the other projections adapted to enter said recesses, the rim having corrugations adapted to yield to permit its expansion, and means for expanding the center comprising a conical hub member and means for forcing the wheel center upon said cone.

6. A wheel comprising a rim and a center, one having recesses and the other projections adapted to enter said recesses, to lock the two together, the center being expandible to interlock said recesses and projections, the center having hub bearing surfaces separated in an axial direction, a hub upon which said surfaces of the wheel center bear, and means for drawing said hub bearing surfaces of the center together to expand the center to interlock center and rim.

7. A wheel comprising a rim, an expansible center web adapted to be secured to the rim by expansion, said center web having a hub opening, an inner and an outer face plate having rotatively interlocking engagement with the center web and having conical flanges engaging the inner edge of the center web, and means for forcing said face plates together.

8. A wheel comprising a radially corrugated web forming the wheel center and having a hub opening, face plates having cones entering the hub openings from opposite sides and inwardly projecting fingers entering the corrugations in the web, conical hub members carried by the hub and entering said face plates and means for drawing said conical hub members together.

9. A wheel comprising a rim, a metallic web forming the wheel center, said web being radially corrugated and having a hub opening, hub face plates having flanges entering said hub opening and fingers entering the corrugations in the central or spoke web, a cone secured to the hub and entering within the flange of one face plate, and a hub cap screwing upon the hub and having a cone entering the other face plate.

Signed at Seattle, Washington, this 2nd day of May, 1918.

ALVIN H. SHOEMAKER.